United States Patent [19]

Pompei

[11] Patent Number: 5,017,019
[45] Date of Patent: May 21, 1991

[54] RADIATION DETECTOR FOR DIFFERENTIAL BIOLOGICAL TEMPERATURE READINGS

[75] Inventor: Francesco Pompei, Wellesley Hills, Mass.

[73] Assignee: Exergen Corporation, Newton, Mass.

[21] Appl. No.: 339,073

[22] Filed: Apr. 14, 1989

[51] Int. Cl.$^5$ .............. G01J 5/16; G01J 5/10; G01K 1/20
[52] U.S. Cl. .................. 374/133; 128/736; 128/664; 374/121; 364/582
[58] Field of Search .......... 374/121, 124, 129, 130, 374/133, 128; 128/664, 736; 364/582

[56] References Cited

U.S. PATENT DOCUMENTS

| | | | |
|---|---|---|---|
| 3,273,395 | 9/1966 | Schwarz | 374/133 |
| 3,614,892 | 10/1971 | Ottenstein | 364/582 |
| 3,777,568 | 12/1973 | Risgin et al. | 374/128 |
| 3,845,288 | 10/1974 | Cornyn, Jr. et al. | 364/582 |
| 4,141,149 | 2/1979 | George et al. | 33/555.3 |
| 4,210,024 | 7/1980 | Ishiwatari et al. | 374/171 |
| 4,343,182 | 8/1982 | Pompei | 374/124 |
| 4,456,390 | 6/1984 | Junkert et al. | 374/128 |
| 4,481,417 | 11/1984 | Inglee | 374/144 |
| 4,698,756 | 10/1987 | Gonzalez et al. | 364/582 |
| 4,874,253 | 10/1989 | Pompei et al. | 374/128 |

FOREIGN PATENT DOCUMENTS 2430262 1/1976 Fed. Rep. of Germany ...... 374/133
1226540 3/1971 United Kingdom ............... 374/133

OTHER PUBLICATIONS

Exergen Corporation product description of Microscanner E autozero Electrical Inspection Infrared Heat Scanner (1987).
Exergen Corporation product description of Exergen EHS Infrared Scanner (no date).
Omega Medical user manual for Surface Temperature Scanner, Models: STS-100-F/C and STS-101-C (1987).
Omega Medical product description of Surface Temperature Scanner STS-100-F/C & 101-C (no date).
Y. Houdas and E. F. J. Ring, Human Body Temperature (Plenum Press: New York), p. 83 (no date).

Primary Examiner—William A. Cuchlinski, Jr.
Assistant Examiner—Diego F. F. Gutierrez
Attorney, Agent, or Firm—Hamilton, Brook, Smith & Reynolds

[57] ABSTRACT

A radiation detector provides differential temperature readings of surface tissue. The differential readings are normalized to room temperature ambient. Green and yellow LEDs indicate a normalized temperature of less than 2° C. and red LEDs indicate a normalized temperature differential of greater than 2° C.

18 Claims, 3 Drawing Sheets

RADIATION DETECTOR FOR DIFFERENTIAL BIOLOGICAL TEMPERATURE READINGS

BACKGROUND OF THE INVENTION

Radiation detectors which utilize thermopiles to detect the heat flux from target surfaces have been used in various applications. In some applications, an indication of the temperature of the target surface is provided as a function of the measured heat flux. Such radiation detectors have been used by physicians to scan patients to note regions of elevated temperature. An injury results in increased blood flow which in turn results in a higher surface temperature.

Often it is the difference between different surface areas which is of interest. For example, when one limb is injured, another limb may be scanned to provide a reference temperature. The difference between that reference temperature and the temperature of the surface area over the injury is indicative of the extent of the injury.

SUMMARY OF THE INVENTION

A radiation detector has been developed which is particularly suited to equine applications, and features of the detector may be extended to other applications as well.

To provide an indication of injury, a differential reading relative to different surface areas of a horse was made using a radiation detector disclosed in prior application Ser. No. 07/032,067 filed Mar. 27, 1987 for "Radiation Detector with Temperature Display." Prior studies had indicated that a differential temperature of greater than about two degrees was an indication of internal injury. However, it was discovered that normal tissue would provide a differential temperature reading of that magnitude at low ambient temperatures such as those experienced in a barn during winter. For example, it has been determined that a normal condition which results in a one-degree temperature differential at ambient temperature of about 20° C. results in a temperature differential of more than twice that amount at cooler ambient temperatures approaching 10° C. The previously disclosed infrared detector is temperature compensated, so it provides accurate differential surface temperature readings, but the interpretation of those readings changes according to ambient temperature.

In accordance with the present invention, the radiation detector comprises a thermopile mounted to view target surfaces to sense the heat flux from the target surfaces and a temperature sensor for sensing ambient temperature. An electronic circuit is coupled to the thermopile and the temperature sensor. The circuit provides an indication of the difference between temperatures of surfaces viewed by the thermopile, and the difference is adjusted to provide a normalized differential. The normalized differential includes a compensation for the difference between the actual ambient temperature to which the surface is exposed and a predetermined ambient temperature. Thus, where it is known that a temperature differential of two degrees at ambient temperature of 20° C. indicates injury, differential readings at other ambient temperatures of the same injury are compensated to provide a reading not of the actually measured temperature differential but of the temperature differential which would have resulted at ambient temperature of 20° C.

For the equine application, it has been determined that the electronics should provide a compensation factor of about minus seven percent per degree centigrade between ambient temperature and a predetermined referenced ambient temperature. The preferred reference ambient temperature is about 20° C. The circuit should further include temperature compensation for nonlinearities in the thermopile response with ambient temperature. This is generally a much lesser compensation in the order of about plus one percent per degree centrigrade.

In a preferred implementation, the display on the detector which provides a differential temperature reading has principal changes in the display at differential temperatures of about 2° C. and 3° C. In particular, a preferred device has a green indication for normalized temperature differentials between zero and 2° C., a yellow indication for normalized temperature differentials between 2° C. and 3° C., a first red indication for normalized temperature differentials between 3° C. and 4° C., and a second red indication for normalized temperature differentials above 4° C. Similar color indications are provided in a bar graph embodiment.

BRIEF DESCRIPTION OF THE DRAWINGS

The foregoing and other objects, features and advantages of the invention will be apparent from the following more particular description of preferred embodiments of the invention, as illustrated in the accompanying drawings in which like referenced characters refer to the same parts throughout the different views. The drawings are not necessarily to scale, emphasis instead being placed upon illustrating the principles of the invention.

DESCRIPTION OF PREFERRED EMBODIMENTS

Figure 1:
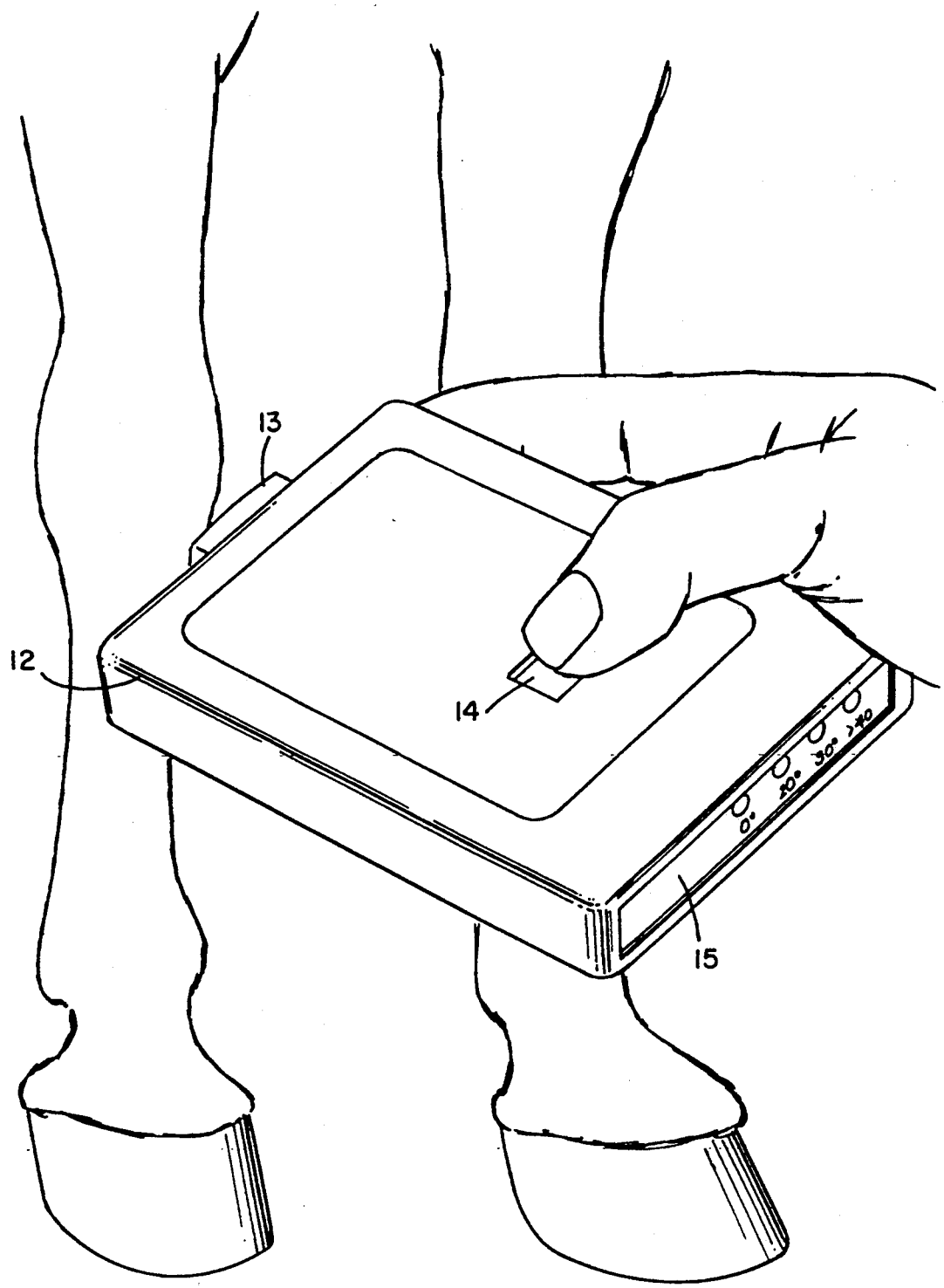
FIG. 1 illustrates an infrared scanner embodying the present invention being used to scan the leg of a horse.

The infrared scanner of FIG. 1 is a modification of that presented in FIG. 6 in prior application Ser. No. 07/032,067. That prior device was designed for differential readings of electrical facilities. A thermopile within the housing 12 of the detector views a target through a window in the nose 13 to obtain a temperature reading. In the electrical application, a reading of an ambient temperature surface was obtained when the power button 14 was pressed. Subsequent readings were differential readings relative to that ambient temperature. A display 15 of four light emitting diodes (LEDs) indicated temperature differentials of less than 10° C., between 10° C. and 20° C., between 20° C. and 65° C. and of greater than 65° C. That unit has been modified to include differential readings of zero degree, 2° C., 3° C. and 4° C. for the equine application; and the electronics have been modified as will be discussed below.

In use, the detector is pointed toward a normal like surface of the horse, and the button 14 is pressed to obtain a reference reading. Thereafter, the detector is scanned across a surface under which an injury is suspected to provide readings on the four-LED display of the differential temperature relative to the normal reference temperature.

Figure 2:
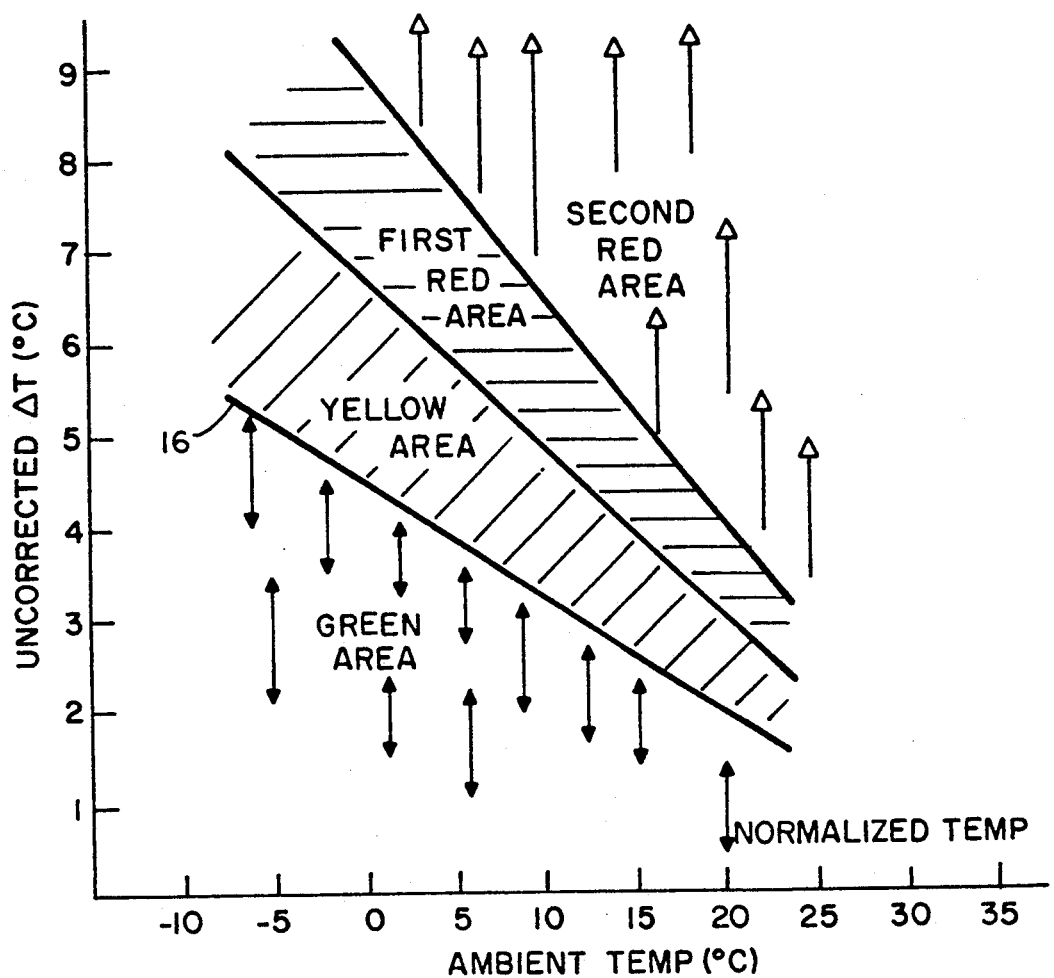
FIG. 2 illustrates the response of the detector of FIG. 1 with changes in ambient temperature.

When the environment surrounding the surface is at about room temperature or 20° C., the LED display provides an accurate indication of the actual difference in temperature between the target surfaces. At room temperature, it is recognized that a temperature differential of greater than two degrees may indicate an injury, and greater than three degrees certainly indicates injury. However, as illustrated in FIG. 2, the same injury which results in a two-degree temperature differential at room temperature will result in a significantly higher temperature differential at cooler temperatures. This is indicated by the line 16. Similarly, a temperature which would result in an acceptable green indication with only a one-degree difference at room temperature would result in a difference of over two degrees at ambient temperature near 10° C. Thus, a detector which provides an accurate reading of temperature differential does not provide a direct indication of the level of concern. An otherwise normal reading might provide a red indication merely because of the ambient temperature.

To overcome this problem, all temperature readings of the detector are normalized to provide a reading of the temperature differential as it would be if the target were surrounded by ambient temperature of about 20° C.

Figure 3:
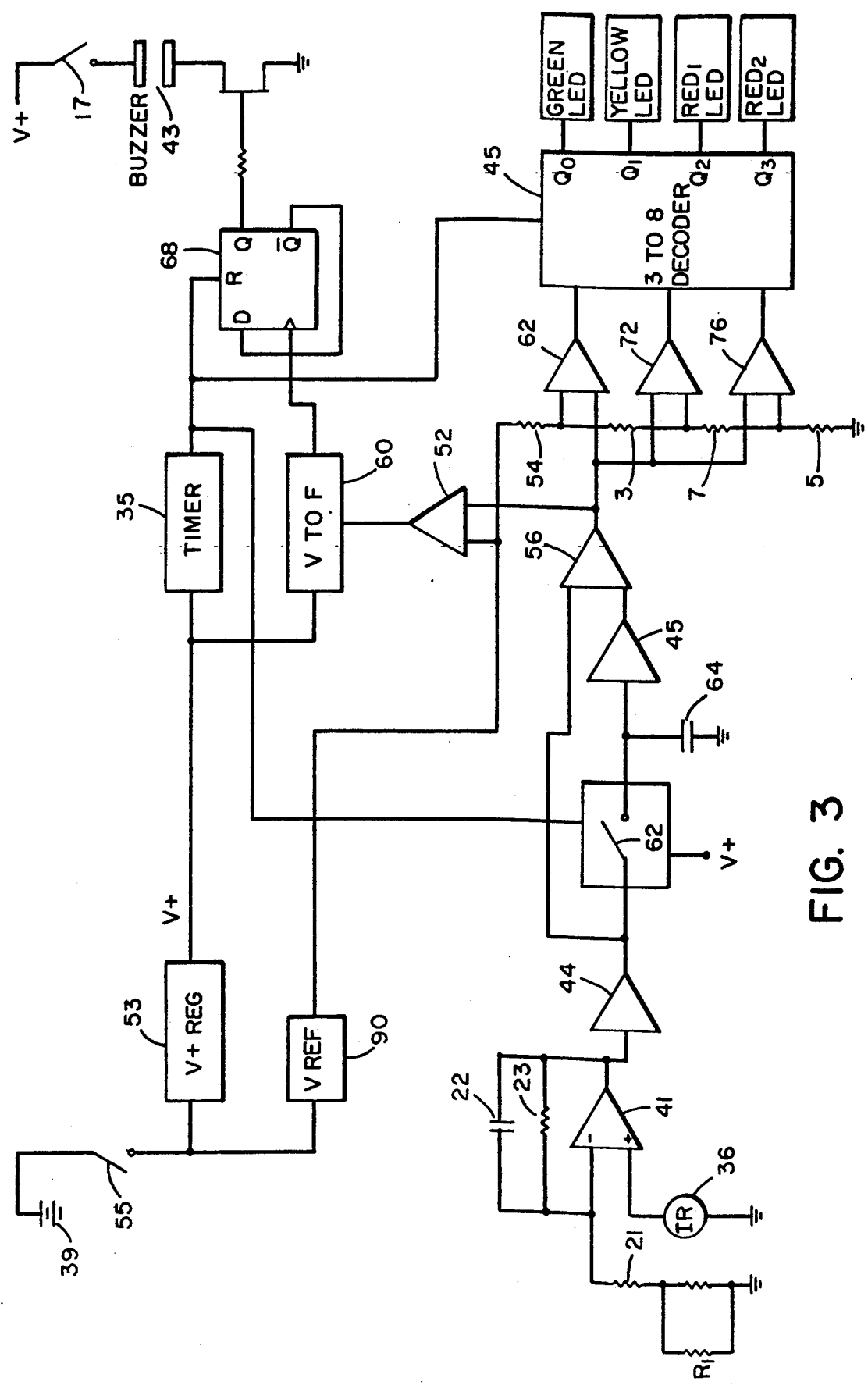
FIG. 3 is an electrical schematic of the detector of FIG. 1.

With the electrical implementation of FIG. 3, the voltage output from the thermopile 36 is amplified by an operational amplifier 41. The gain of that amplifier is determined by the resistors 20, 21 and 23 and capacitor 22. In the prior detector utilized for monitoring electrical facilities, a thermistor $R_T$ was also coupled to the amplifier 41 to account for nonlinearities of the thermopile response with change in ambient temperature. That thermistor allowed for a temperature coefficient of about $+0.7\%/°$ C. In accordance with the present invention, that thermistor is replaced with a much larger thermistor which not only compensates for the nonlinear thermal response of the thermopile 36 but also provides for about $-7\%/°$ C. normalization of the detected temperature differential to a room temperature reading. Specifically, the thermistor provides for the response illustrated in FIG. 2. The combined compensation is about $-6\%/°$ C.

Further operation of the circuit is identical to that presented in the prior application Ser. No. 07/032,067 but is described again here.

The output of operational amplifier 41 is further amplified by amplifier 44. Power switch 55 is closed by the user upon operation of the device and whenever a reference temperature is to be sensed. Power switch 55 connects battery 39 to the circuit. Timer 35 is in turn powered and closes switch 62 for about 0.5 seconds. During this interval, the negative voltage output from amplifier 44 is stored on capacitor 64. The timer 35 also holds a flip-flop 68 in reset to hold a buzzer 43 off, and the timer disables the display until the capacitor 64 is charged. At the end of the 0.5 seconds, the timer 35 opens switch 62 to discontinue the charging of capacitor 64, enables the flip-flop 68, and enables the green LED signifying that the device is autozeroed.

The negative charge held by capacitor 64 is applied through buffer 45. The negative voltage output of buffer 44 is the autozero reference signal which is later summed by differential amplifier 56 with radiation signals from amplifier 44 indicative of temperatures sensed by sensor 36. For targets emitting more energy than the autozero reference target, differential amplifier 56 has a positive output, and for targets emitting less energy than the autozero target, differential amplifier 56 has a negative output. That is, the output voltage from amplifier 56 is a voltage indicative of the difference between the reference temperature and the temperature being observed. The voltage drives comparators 62, 72, and 76 to produce inputs to a 3 to 8 decoder 45. The second inputs to the comparators are taken from a voltage divider of resistors 54, 3, 7 and 5 which divides the 2.53V reference voltage from reference voltage generator 90 into voltages corresponding to the sensed change in radiation with the change in temperatures of the display. With a low sensed change in radiation, the output voltage from summing amplifier 56 is less than that across resistor 5 and none of the three comparators are enabled. The decoder 45 in turn illuminates only the green LED. With a somewhat higher change in sensed radiation, the output voltage surpasses that across resistor 5, and comparator 76 is enabled. Comparator 76 then places a high input to decoder 45 which causes the decoder to illuminate the yellow LED and dim the green LED. With a higher change in sensed radiation the voltage across resistors 3 and 7 is matched and comparator 72 is enabled. Comparator 72 in turn places a high input to decoder 45 which causes the first red LED to be illuminated and the yellow LED to be dimmed. With yet a higher change in sensed radiation, the voltage across resistors 54 and 3 is matched and comparator 62 is enabled. Comparator 62 places a high input to decoder 45 which in turn selects to illuminate just the second red LED.

The output voltage from amplifier 56 also controls a voltage to frequency device 60 which pulses the clock of D flip-flop 68 to sound buzzer 43. The output voltage is offset at comparator 52 so that the voltage to frequency device 60 is at its lowest frequency at ambient and at its highest frequency when near the three-degree centigrade change in radiation threshhold. Once this threshhold is crossed the buzzer 43 sounds continuously. The buzzer sounds with increasing pulse frequency corresponding to the green and yellow LEDs. The buzzer 43 can be disabled by the user pressing a switch for applications where the audible signal is not wanted.

While this invention has been particularly shown and described with references to preferred embodiments thereof, it will be understood by those skilled in the art that various changes in form and details may be made therein without departing from the spirit and scope of the invention as defined by the appended claims. For example, the invention may be applied to human or other patients, and the term "animal" is intended to include humans. A microprocessor-based system disclosed in application Ser. No. 07/280,546 filed Dec. 6, 1988 may readily be programmed to provide the required normalization.

What is claimed is:
1. A radiation detector comprising:
thermopile means mounted to view target surfaces for sensing the heat flux from said target surfaces and to determine the temperature of said target surfaces;
a temperature sensor for sensing ambient temperature;
an electronic circuit coupled to the thermopile means and temperature sensor and responsive to the voltage across the thermopile means and the temperature sensed by the sensor to provide a difference between temperatures of target surfaces viewed by the thermopile means, the difference being adjusted to provide a normalized temperature differential compensated for difference in surface temperature which results from a deviation of actual ambient temperature to which the surface is exposed from a predetermined ambient temperature; and a display for providing an indication of the normalized temperature differential.

2. A radiation detector as claimed in claim 1 wherein the electronics compensates for the difference between the actual ambient temperature and predetermined ambient temperature by a factor of about minus seven percent per degree centigrade.

3. A radiation detector as claimed in claim 2 wherein the predetermined ambient temperature is about 20° C.

4. A radiation detector as claimed in claim 1 which further compensates for the temperature coefficient of the thermopile means with changes in ambient temperature.

5. A radiation detector as claimed in claim 1 wherein the display includes a principal change in indication at about 2° C. normalized to about 20° C.

6. A radiation detector as claimed in claim 5 wherein the display further includes a principal change in indication at about 3° C. normalized to 20° C.

7. A radiation detector as claimed in claim 5 wherein the display provides changes in indications at 2°, 3° and 4° C. normalized to about 20° C.

8. A radiation detector as claimed in claim 5 wherein the display comprises a green indication for normalized differential temperatures between zero and 2° C., a yellow indication for normalized temperature differentials between 2° C. and 3° C., and a red indication for normalized temperature differentials above 3° C.

9. A method of providing a differential thermal reading representing the difference in temperatures of surface areas of an animal comprising:

sensing heat flux from first and second surface areas of the animal to determine the temperature of said first and second surfaces areas;

sensing ambient temperature;

providing a normalized temperature differential representing the difference in temperatures of the first and second surface areas compensated for difference in surface temperature which results from a deviation of actual ambient temperature to which the surface is exposed from a predetermined ambient temperature; and providing a display of the normalized temperature differential.

10. A method as claimed in claim 9 wherein the compensation is by a factor of about $-7\%/°$ C.

11. A method as claimed in claim 10 wherein the predetermined temperature is about 20° C.

12. A method as claimed in claim 9 wherein the heat flux is sensed by a thermopile, and further comprising the step of compensating for the temperature coefficient of the thermopile with changes in ambient temperature.

13. A method as claimed in claim 9 including providing a principal change in the display at about 2° C. normalized to 20° C.

14. A method as claimed in claim 13 further comprising providing a principal change in the display at about 3° C. normalized to 20° C.

15. A method as claimed in claim 13 further comprising providing principal changes in the display at 2° C., 3° C. and 4° C. normalized to about 20° C.

16. A method as claimed in claim 13 comprising displaying a green indication for normalized differential temperatures between zero degree and 2° C., a yellow indication for normalized temperature differentials between 2° C. and 3° C., and a red indication for normalized temperature differentials above 3° C.

17. A method as claimed in claim 9 wherein the animal is a horse.

18. A method of providing a differential thermal reading representing the difference in temperatures of surface areas comprising:

sensing heat flux from first and second surface areas to determine the temperature of said first and second surfaces areas;

sensing ambient temperature;

providing a normalized temperature differential representing the difference in temperatures of the first and second surface areas compensated for difference in surface temperature which results from a deviation of actual ambient temperature to which the surface is exposed from a predetermined ambient temperature; and providing a display of the normalized temperature differential.

* * * * *